United States Patent
Aharoni et al.

(10) Patent No.: US 11,424,928 B2
(45) Date of Patent: Aug. 23, 2022

(54) PREVENTING MALFORMED CIPHERTEXT ATTACKS ON PRIVACY PRESERVING BIOMETRIC AUTHENTICATION

(71) Applicant: International Business Machines Corporation, Armonk, NY (US)

(72) Inventors: Ehud Aharoni, Kfar Saba (IL); Omri Soceanu, Haifa (IL); Ariel Farkash, Shimshit (IL); Allon Adir, Kiryat Tivon (IL)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 16/888,672

(22) Filed: May 30, 2020

(65) Prior Publication Data

US 2021/0377031 A1    Dec. 2, 2021

(51) Int. Cl.
  *G06F 21/00*   (2013.01)
  *H04L 9/32*    (2006.01)
  *H04L 9/40*    (2022.01)
  *H04L 9/00*    (2022.01)

(52) U.S. Cl.
  CPC ............ *H04L 9/3231* (2013.01); *H04L 9/008* (2013.01); *H04L 63/0861* (2013.01)

(58) Field of Classification Search
  CPC ... H04L 9/3231; H04L 9/008; H04L 63/0861; H04L 63/0428; H04L 63/1441
  See application file for complete search history.

(56) References Cited

U.S. PATENT DOCUMENTS

| | | | | |
|---|---|---|---|---|
| 9,774,596 | B2* | 9/2017 | Mandal | .................. G06F 21/32 |
| 2009/0113209 | A1* | 4/2009 | Lee | ......................... G06F 21/32 |
| | | | | 713/186 |
| 2015/0341349 | A1 | 11/2015 | Mandal | |
| 2019/0394018 | A1* | 12/2019 | Isshiki | .................. H04L 9/0819 |
| 2020/0014541 | A1 | 1/2020 | Streit | |

(Continued)

OTHER PUBLICATIONS

Multi-Biometric Template Protection Based on Homomorphic Encryption.

*Primary Examiner* — Kendall Dolly
(74) *Attorney, Agent, or Firm* — Gregory J Kirsch

(57) ABSTRACT

Embodiments may include techniques to prevent illegal ciphertexts using distance computations on homomorphic and/or functional encrypted templates while detecting whether the resulting distance does not meet requirements for validity. For example, a method may comprise receiving and storing enrollment information from a client computer system, the enrollment information comprising an encrypted enrollment template of authentication data and a plurality of randomly generated encrypted templates, receiving an additional encrypted template to be used to authenticate the user from the client computer system, authenticating the user by determining distances between the received additional encrypted template and the stored encrypted enrollment template and the each of the stored plurality of randomly generated encrypted templates, and determining that authentication is successful when the received additional encrypted template meets distance requirements relative to the stored encrypted enrollment template and the each of the stored plurality of randomly generated encrypted templates.

17 Claims, 3 Drawing Sheets

(56) References Cited

U.S. PATENT DOCUMENTS

2020/0228340 A1* 7/2020 Blackhurst ............ H04L 9/3231
2020/0358611 A1* 11/2020 Hoang .................... H04L 9/008
2021/0160076 A1* 5/2021 Yang ..................... H04L 9/0894

* cited by examiner

PREVENTING MALFORMED CIPHERTEXT ATTACKS ON PRIVACY PRESERVING BIOMETRIC AUTHENTICATION

BACKGROUND

The present invention relates to techniques to prevent illegal ciphertexts attacks on a server that uses Functional Encryption (FE) or Homomorphic Encryption (HE) for Biometric authentication including, for example, distance computations on homomorphic and/or functional encrypted templates while detecting whether the resulting distance does not meet requirements for validity.

Homomorphic Encryption (HE) is an encryption technology that allows performing a function on ciphertexts to generate an encrypted result which, when decrypted, matches the result of the operations as if they had been performed on the plaintext.

For example, if C1 is the encryption of T1, and C2 the encryption of T2, then some function f may exist such that C3=f(C1,C2) is the encryption of T1+T2 (arithmetic sum). A similar function may exist for multiplication and other operations. If T1 and T2 are vectors, then there may exist a function g such that C3=g(C1,C2) is the encryption of the Euclidean distance between T1 and T2. A fully homomorphic encryption scheme allows computing any function on the plaintexts through operations of the ciphertexts.

Another type of encryption, called Functional Encryption (FE), allows the computation of a function on ciphertexts C1 and C2, which will produce in the same result as the application of a function on the corresponding plaintexts T1 and T2. For example, an FE system may include a function f, such that f(C1,C2) is equal to the Euclidean distance between T1 and T2. One difference from HE is that in applying functional encryption, the result of the calculation is received in the clear, that is, not encrypted.

Both methods can be used, for example, for Biometric authentication on a server (for example, in the cloud), for preserving privacy. Typically, biometric authentication on a server may be done as follows: When a user enrolls (signs-up), their client device may compute a biometric template T1 that identifies them, and then submit T1 to the server. The server keeps all biometric templates of all users. When users later authenticate (sign-in), their client device may compute a new biometric template T2, and send it to the server. The server computes the distance between T1 and T2 according to some distance metric, and authenticates the user if the templates are close enough.

In a privacy preserving biometric authentication scheme, FE or HE systems are used so that the users can provide the templates in encrypted form. They'll keep the private key secret, so the server will never be able to decipher the biometric data itself. But thanks to the FE/HE properties, the server will be able to compute the distance between T1 and T2 needed for authentication. If HE is used, then the computed distance is still encrypted. The server can have the client decrypt it without revealing information to the client by some form of Zero Knowledge proof (for example, the server can further manipulate the encrypted distance to mask the true distance).

A vulnerability of such a scheme is when a malicious user tries to illegally authenticate as a different user, by sending an illegal cipher text C*. While the known FE and HE systems provide various security guarantees, these guarantees assume proper usage of the encryption algorithm. If the ciphertext C* was computed by an encryption algorithm that was tampered with, most of the guarantees may be void.

For example, it may happen that C* will be devised such that the distance computed by the server between C* and some other ciphertext $C_1$ will be zero, or another low number, for any ciphertext $C_1$. Such an attack is easily implemented in at least one FE scheme, where a malicious client can send an encrypted all zero vector, in violation of the FE encryption scheme, which prescribes a specific way to encode information within this vector. Such a malformed ciphertext is guaranteed to produce zero distance with any other ciphertext. Such an attack may be possible as well for some or all HE encryption schemes.

Accordingly, a need arises for techniques to prevent illegal ciphertexts attacks on a server that uses Functional Encryption (FE) or Homomorphic Encryption (HE) for Biometric authentication.

SUMMARY

Embodiments may include techniques to prevent illegal ciphertexts attacks on a server that uses Functional Encryption (FE) or Homomorphic Encryption (HE) for Biometric authentication. Such techniques may provide, for example, distance computations on homomorphic and/or functional encrypted templates while detecting whether the resulting distance does not meet requirements for validity.

Embodiments may provide techniques to prevent illegal ciphertexts attacks on a server that uses Functional Encryption (FE) or Homomorphic Encryption (HE) for Biometric authentication. In embodiments, during sign-up the user may compute their own biometric template $P_0$, and n more templates $P_1, P_2, \ldots, P_n$, chosen randomly and spread over a wide space, such that all of them are more than a defined distance from $P_0$. All such templates may be encrypted as $C_0, C_1, \ldots, C_n$ and sent to the server.

During sign-in the server may check the newly received biometric template $P_{new}$ against all $P_0, P_1, \ldots, P_n$. The requirement may be that $P_{new}$ is close to $P_0$ as usual, but the server may also check the distances between $P_{new}$ and $P_1, \ldots, P_n$, and may verify it meets a defined requirement. If a malicious client sends an illegal cipher C* that always produces low distances, this requirement will fail. Embodiments may include variants of the requirement. For example, embodiments may simply require the determined distances to be larger than a defined amount, embodiments may require the determined distances to be close to known distances, embodiments may require the determined distances to be in a known order, embodiments may require the determined distances to hold to some known geometric invariant, such as a triangle inequality, etc. For example, a basic triangle inequality states that for any triangle, the sum of the lengths of any two sides must be greater than or equal to the length of the remaining side, for example of the form $z<x+y$.

In embodiments, these techniques may be generalized to test the validity of computation over ciphertexts in general (not just distance functions).

For example, in an embodiment, a method of user enrollment and authentication processing may be implemented in a computer system comprising a processor, memory accessible by the processor, and computer program instructions stored in the memory and executable by the processor, and the method may comprise receiving and storing enrollment information from a client computer system, the enrollment information comprising an encrypted enrollment template of authentication data and a plurality of randomly generated encrypted templates, receiving an additional encrypted template to be used to authenticate the user from the client computer system, authenticating the user by determining distances between the received additional encrypted template and the stored encrypted enrollment template and the each of the stored plurality of randomly generated encrypted templates, and determining that authentication is successful when the received additional encrypted template meets distance requirements relative to the stored encrypted enrollment template and the each of the stored plurality of randomly generated encrypted templates.

In embodiments, each of the plurality of randomly generated encrypted templates is generated so as to be greater than a defined distance from the enrollment template and the distance requirements may comprise the distance between the encrypted enrollment template and the additional encrypted template may be less than a threshold value, and the distance between the encrypted enrollment template and each of the plurality of randomly generated encrypted templates may be greater than the threshold value. The enrollment information further may comprise a set of the distances between the enrollment template and each of the randomly generated templates, and the distance requirements further may comprise that each distance between the additional encrypted template and a randomly generated encrypted template minus the distance between the encrypted enrollment template and that randomly generated encrypted template is less or equal to the distance between the additional encrypted template and the encrypted enrollment template. Each of the plurality of randomly generated encrypted templates may be generated so as to be ordered such that a triangle inequality holds between the encrypted enrollment template and a randomly generated encrypted template. Each of the plurality of randomly generated encrypted templates may be generated so as to meet a geometric invariant and the authenticating further may comprise verifying that the invariant is meet for the additional encrypted template. The encryption may be Homomorphic Encryption or Functional Encryption and the operations are performed on the encrypted templates using the properties of Homomorphic Encryption or Functional encryption.

In an embodiment, a system for user enrollment and authentication processing may comprise a processor, memory accessible by the processor, and computer program instructions stored in the memory and executable by the processor to perform receiving and storing enrollment information from a client computer system, the enrollment information comprising an encrypted enrollment template of authentication data and a plurality of randomly generated encrypted templates, receiving an additional encrypted template to be used to authenticate the user from the client computer system, authenticating the user by determining distances between the received additional encrypted template and the stored encrypted enrollment template and the each of the stored plurality of randomly generated encrypted templates, and determining that authentication is successful when the received additional encrypted template meets distance requirements relative to the stored encrypted enrollment template and the each of the stored plurality of randomly generated encrypted templates.

In an embodiment, a computer program product for user enrollment and authentication processing may comprise a non-transitory computer readable storage having program instructions embodied therewith, the program instructions executable by a computer, to cause the computer to perform a method comprising receiving and storing enrollment information from a client computer system, the enrollment information comprising an encrypted enrollment template of authentication data and a plurality of randomly generated encrypted templates, receiving an additional encrypted template to be used to authenticate the user from the client computer system, authenticating the user by determining distances between the received additional encrypted template and the stored encrypted enrollment template and the each of the stored plurality of randomly generated encrypted templates, and determining that authentication is successful when the received additional encrypted template meets distance requirements relative to the stored encrypted enrollment template and the each of the stored plurality of randomly generated encrypted templates.

BRIEF DESCRIPTION OF THE DRAWINGS

The details of the present invention, both as to its structure and operation, can best be understood by referring to the accompanying drawings, in which like reference numbers and designations refer to like elements.

DETAILED DESCRIPTION

Embodiments may include techniques to prevent illegal ciphertexts attacks on a server that uses Functional Encryption (FE) or Homomorphic Encryption (HE) for Biometric authentication. Such techniques may provide, for example, distance computations on homomorphic and/or functional encrypted templates while detecting whether the resulting distance does not meet requirements for validity.

Embodiments may provide techniques to prevent illegal ciphertexts attacks on a server that uses Functional Encryption (FE) or Homomorphic Encryption (HE) for Biometric authentication. In embodiments, during sign-up the user may compute their own biometric template $P_0$, and n more templates $P_1, P_2, \ldots, P_n$, chosen randomly and spread over a wide space, such that all of them are more than a defined distance from $P_0$. All such templates may be encrypted as $C_0, C_1, \ldots, C_n$ and sent to the server.

During sign-in the server may check the newly received biometric template $P_{new}$ against all $P_0, P_1, \ldots, P_n$. The requirement may be that $P_{new}$ is close to $P_0$ as usual, but the server may also check the distances between $P_{new}$ and $P_1, \ldots, P_n$, and may verify it meets a defined requirement. If a malicious client sends an illegal cipher C* that always produces low distances, this requirement will fail. Embodiments may include variants of the requirement. For example, embodiments may simply require the determined distances to be larger than a defined amount, embodiments may require the determined distances to be close to known distances, embodiments may require the determined distances to be in a known order, embodiments may require the determined distances to hold to some known geometric invariant, etc.

In embodiments, these techniques may be generalized to test the validity of computation over ciphertexts in general (not just distance functions).

Figure 1:
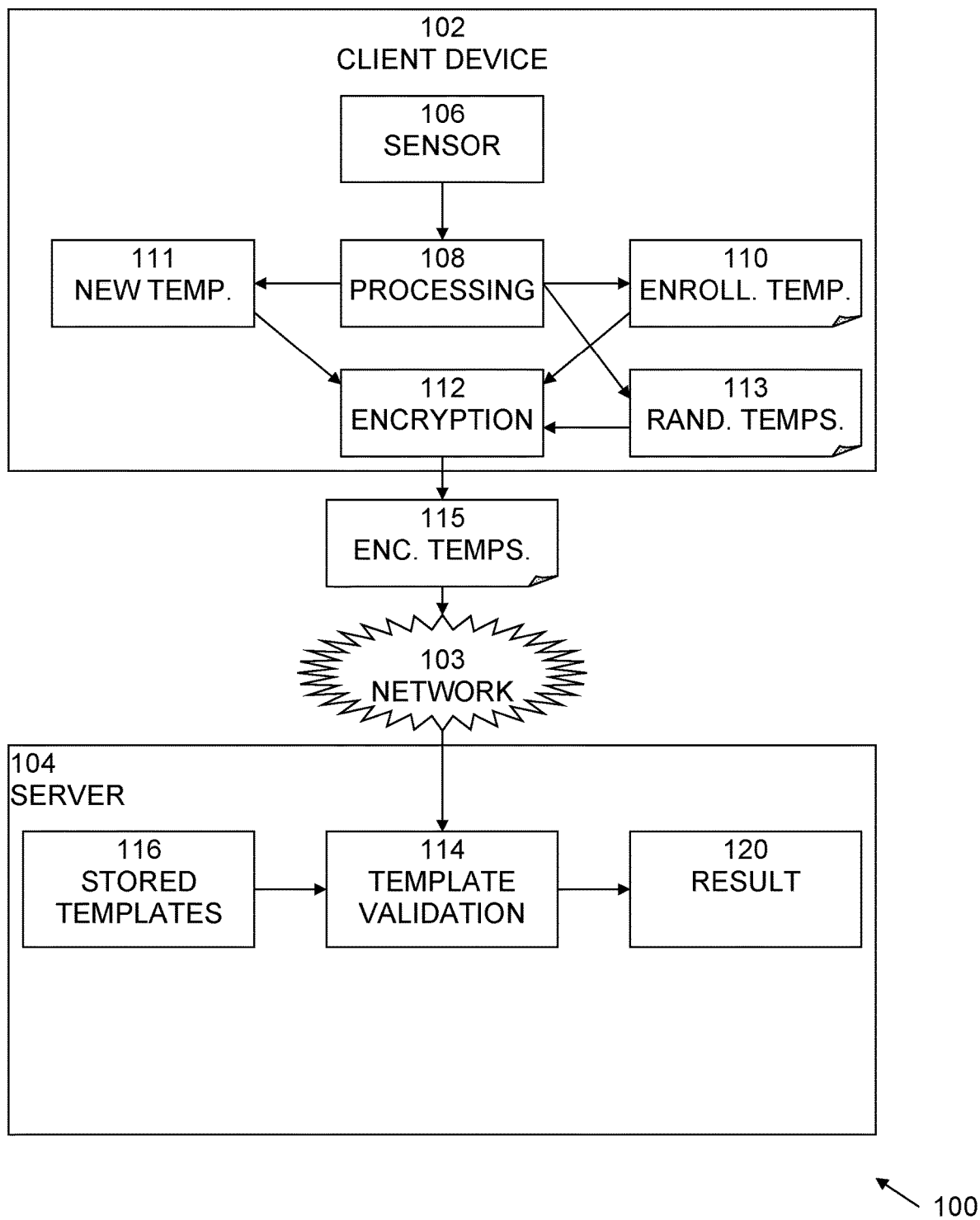
FIG. 1 is an exemplary block diagram of a biometric enrollment and authentication system according to embodiments of the present techniques.

An exemplary block diagram of a biometric enrollment and authentication system 100 is shown in FIG. 1. In this example, system 100 may include a client device 102, network 103, and a server 104. Client device 102 may include biometric sensor 106, processing block 108, enrollment template 110, new template 111, encryption block 112, and random templates 113. Biometric sensor 106 is the interface between the real world and the system and may acquire all the needed biometric data. Examples of such biometric sensors may include physiological trait sensors, such as fingerprint readers, iris scanners, face scanners, palm print scanners, hand vein scanners, finger geometry scanners, ear geometry scanners, retinal scanners, tooth shape scanners, behavioral trait sensors, such as signature capture devices or scanners, walking gait detection scanners, voice capture devices, keystroke capture devices or apps, etc. Such sensors may include visual capture devices, such as cameras, audio capture devices, such as microphones, etc., along with associated circuitry.

Processing block 108 may include one or more processing devices, such as processors, CPUs, GPUs, etc. Processing block 108 may perform pre-processing, such as removing artifacts from the sensor signal or data, enhancing the input, such as removing background noise, data normalization, etc. Further, Processing block 108 may perform extraction of features from the pre-processed signal or data to generate a template 110, 111. Templates 110, 111 typically include a vector of features, for example, represented as numbers indicating the value of each feature. A template may be a synthesis of the relevant characteristics extracted from the sensor signal or data. For example, the raw form of biometric information may be processed to form a template, which may be a vector containing values representing features of the biometric information. Random templates 113 may be vectors containing only zeros and ones, each drawn independently from a uniform distribution over zero and one. Encryption block 112, which may be implemented in processing block 108, or may be implemented separately, may encrypt templates 110, 111, 113 before transmission to server 104 as encrypted templates 115.

Server 104 may include a template validation block 114, a plurality of stored templates and random templates 116, and results 120. In embodiments, stored templates 116 may include one or more enrollment templates 110 and a plurality of random templates 113 received from client device 102, and may be stored in encrypted form 115. In embodiments, when new template 111, which may be encrypted, is received from client device 102, validation block 114 may retrieve stored templates 116 and may compute the distances between new template 111 and stored templates 116, all of which may be encrypted using, for example, FE or HE. If validation block 114 determines that the received new template 111 meets the distance requirements relative to stored templates 116, template validation block 114 may determine that new template 111 is valid. In this case, embodiments may use FE or HE to encrypt the templates, as these forms of encryption allow the matching and validation processes to be performed directly on the encrypted templates. If FE is used, the matching and validation processes results will be available to the server directly. If HE is used, the matching and validation process results will be encrypted, and the server can send them to the client to decrypt them and send back to the server. If the server wants to hide these results from the client, it can first use HE operations to mask them, or use some form of zero knowledge proof.

Figure 2:
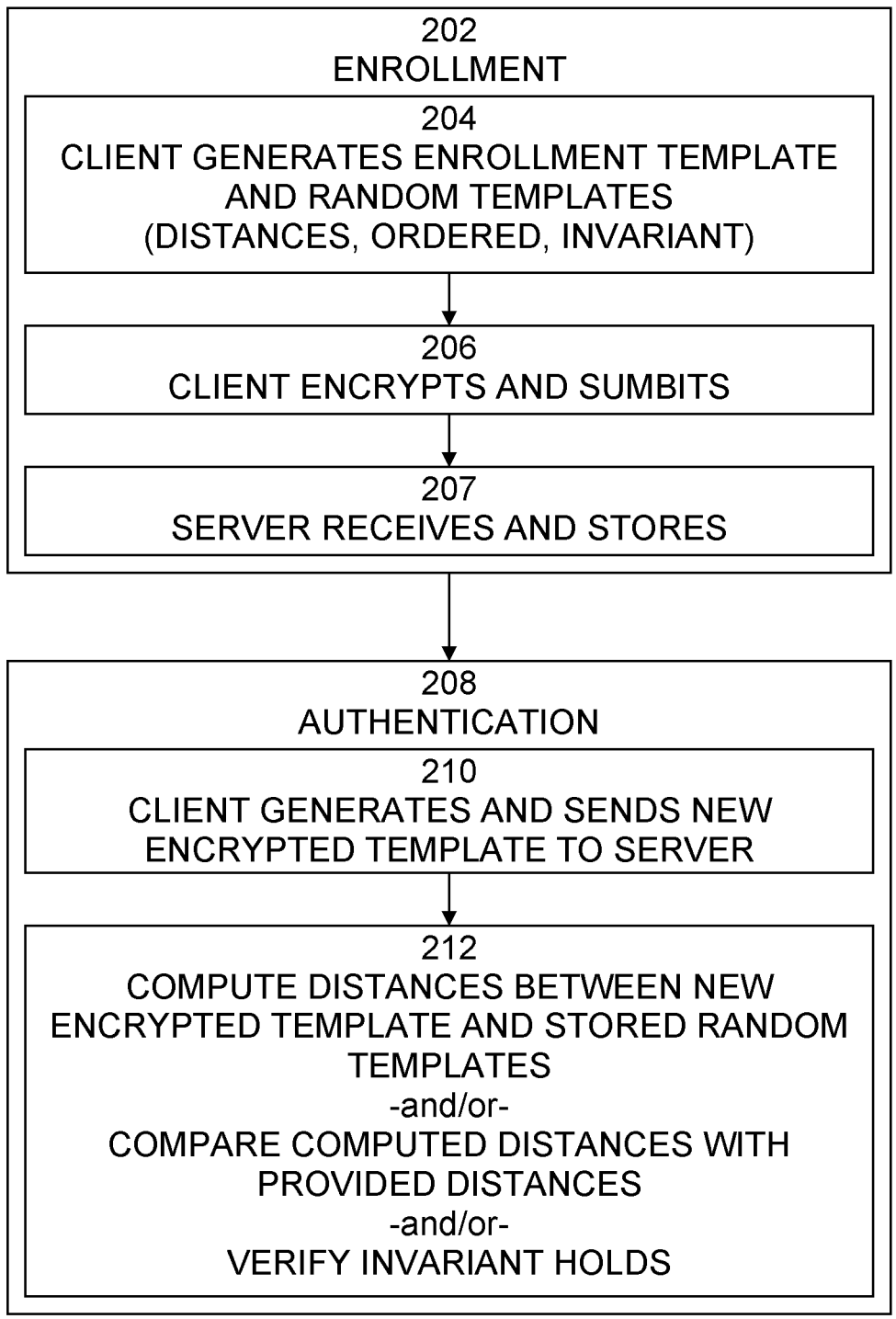
FIG. 2 is an exemplary flow diagram of a process of operation of the exemplary biometric authentication system according to embodiments of the present techniques.

An exemplary flow diagram of a process of user enrollment and authentication according to the present techniques is shown in FIG. 2. It is best viewed in conjunction with FIG. 1. Process 200 begins with 202, an enrollment process of client device 102. Enrollment process 204 may begin with 204, in which, client device 102 may compute 108 a template $P_0$ 110 based on biometric information. Client device 102 may also compute 108 in more templates $P_1$, $P_2$, ..., $P_n$ 113, chosen randomly and spread over a wide space, such that all of them are far enough from $P_0$, that is greater than some defined distance. To avoid revealing information about $P_0$, embodiments may choose $P_1$, $P_2$, ..., $P_n$ 113 such that they're up to half the maximal distance of the possible biometric space. Larger distances will allow the server to determine whether $P_0$ itself is close to the edges of the possible biometric space.

At 206, client device 102 may generate the required public key and private key for either FE and HE, and encrypt 112 the enrollment template 110 and the random vectors 115 and may send the encrypted templates $C_0$, $C_1$, ..., $C_n$ 115 to server 104 which may store the encrypted templates $C_0$, $C_1$, ..., $C_n$ 116.

Client device 102 may send to server 104 the encrypted templates $C_0$, $C_1$, ..., $C_n$ 115 and additional information required for the server to do the distance computations. For example, HE may require sending over the public key, and FE schemes usually require sending some public parameters as well. In either case, client device 102 doesn't send the private key, or any other information that can allow the server to decrypt the data. In addition, the client 102 may send some identification information, for example a user name. At 207, server 104 may store 116 the received template 110 and may store 117 the associated random vectors 115 together with the additional information, including for example the public key and user name.

At 208, client 102 and server 104 may perform user authentication, such as during user sign-in. Authentication 208 may begin with 210, in which a user may use client device 102 to acquire a new biometric measurement using sensor 106 and compute a new template $P_{new}$ 111. Client device 102 may encrypt 112 template $P_{new}$ 111 using, for example HE or FE, and using, for example, the same set of keys used during enrollment, and may then send encrypted template $P_{new}$ 111 to server 104, in addition to identification information, for example, a user name.

At 212, using the ciphertexts, the server may compute the distances between $P_{new}$ 111 and all $P_1$, $P_2$, ..., $P_n$ 113, using the encrypted $P_{new}$ and the stored encrypted templates $C_0$, $C_1$, ..., $C_n$ 116. The process may require the distance between $P_{new}$ and $P_0$ to be less than a threshold distance, that is, $d(P_{new}, P_0) < t$. That means that the new biometric template is similar to the existing template up to a threshold t (the usual authentication process). The process may further require the distances between the new template $P_{new}$ and each of the random templates $P_1$, $P_2$, ..., $P_n$ to be greater than the threshold distance, that is $d(P_{new}, P_i) > t$ for all $i >= 1$.

Thus, if a malicious user sends an illegal cipher text C*, such that C* is devised to always produce a low distance, then cipher text C*, will violate the requirement $d(P_{new}, P_i) > t$, and will fail to authenticate. Also, if C* is devised to produce a low distance for only some biometric templates, and high distance for others, then since the malicious user that devised C* doesn't know the real biometric template $P_0$, the probability of obtaining a low distance just for $P_0$ and high for all others, $P_1$, $P_2$, ..., $P_n$, is low.

In embodiments, during enrollment, at 204, client 102 may provide server 104 with $C_0$, $C_1$, ..., $C_n$ 115 as before, but client 102 may also provide server 104 with a set of the distances between the enrollment template $P_0$ 110 and each of the random templates $P_1$, $P_2$, ..., $P_n$ 113, that is $d(P_0, P_1)$, $d(P_0, P_2)$, ..., $d(P_0, P_n)$. Then, at 212, during sign-in, the server may compute $d(P_{new}, P_0)$, $d(P_{new}, P_2)$, ..., $d(P_{new}, P_n)$. The server requires that $d(P_{new}, P_0)<t$ as before, and also that $|d(P_{new}, P_i)-d(P_0, P_i)|<=d(P_{new}, P_0)$ (This is derived from the triangle inequality).

In embodiments, during enrollment, at 204, client 102 may provide server 104 with $C_0, C_1, C_n$ 115 as before, but also $P_1, P_2, \ldots, P_n$ 113 may be chosen to be ordered such that $d(P_0, P_i)+2t < d(P_0, P_{i+1})$. The distance difference guarantees that if $d(P_{new}, P_0)<t$, then $d(P_{new}, P_i)<d(P_{new}, P_{i+1})$ for all i $>=1$ (again due to the triangle inequality).

In embodiments, during enrollment, at 204, client 102 may provide server 104 with carefully chosen points in space, such that a known geometric invariant is known to hold. For example, client 102 may send $C_0, C_1, \ldots, C_n$ 115 as before, but chosen such that $P_1, P_2, \ldots, P_n$ 113 are co-linear, and $d(P_1, P_2)=d(P_2, P_3)=x$, for some constant x that is also sent to the server. Such a configuration guarantees that for any point in space v, it holds that: $d(v, P_1)^2+d(v, P_3)^2-2d(v, P_2)^2=2x^2$. During sign-in, at 212, the server verifies this invariant holds for the supplied $P_{new}$.

Figure 3:
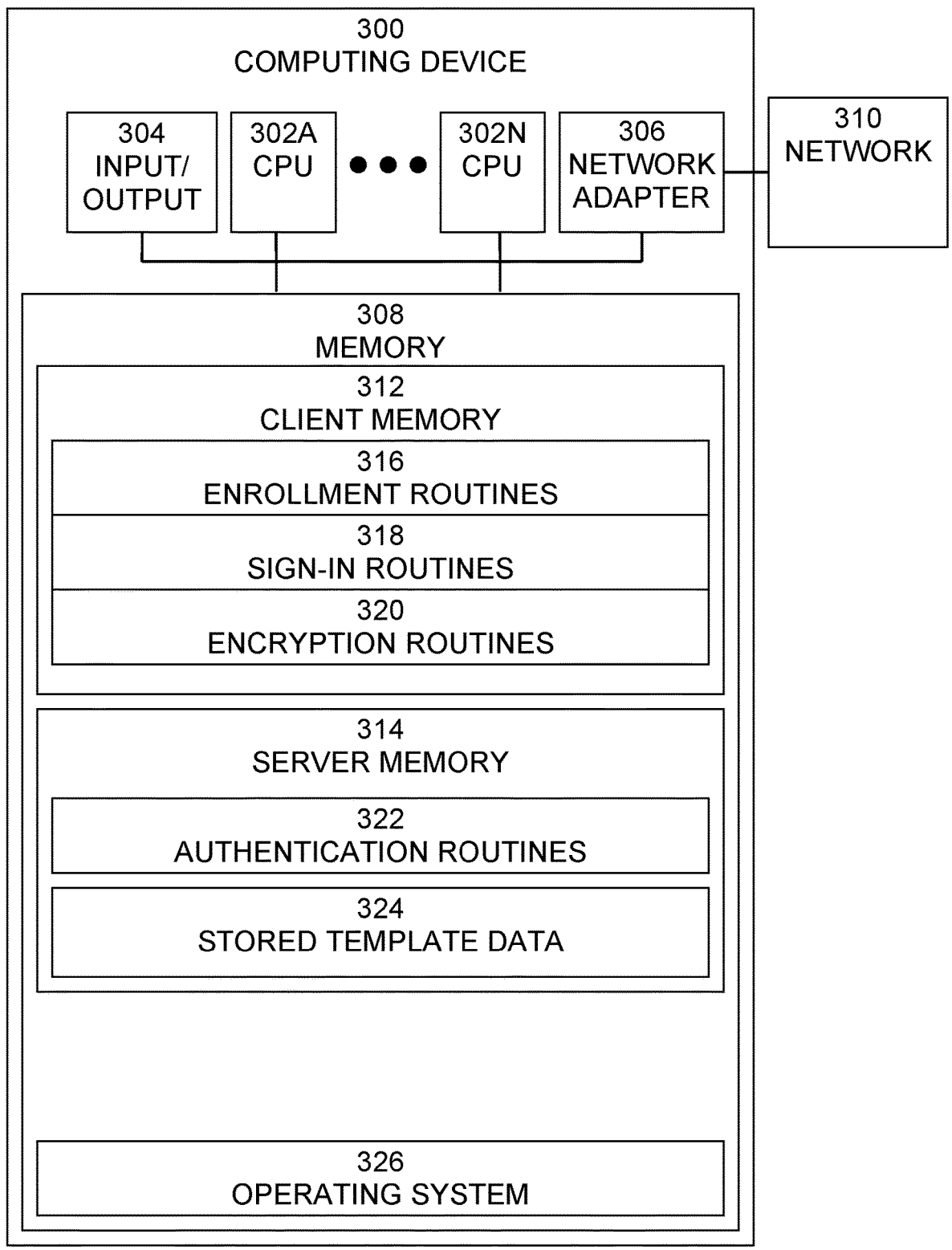
FIG. 3 is an exemplary block diagram of a computer system, in which processes involved in the embodiments described herein may be implemented.

An exemplary block diagram of a computer system 300, in which processes involved in the embodiments described herein may be implemented, is shown in FIG. 3. Computer system 300 may be implemented using one or more programmed general-purpose computer systems, such as embedded processors, systems on a chip, personal computers, workstations, server systems, and minicomputers or mainframe computers, or in distributed, networked computing environments. Computer system 300 may include one or more processors (CPUs) 302A-302N, input/output circuitry 304, network adapter 306, and memory 308. CPUs 302A-302N execute program instructions in order to carry out the functions of the present communications systems and methods. Typically, CPUs 302A-302N are one or more microprocessors, such as an INTEL CORE® processor. FIG. 3 illustrates an embodiment in which computer system 300 is implemented as a single multi-processor computer system, in which multiple processors 302A-302N share system resources, such as memory 308, input/output circuitry 304, and network adapter 306. However, the present communications systems and methods also include embodiments in which computer system 300 is implemented as a plurality of networked computer systems, which may be single-processor computer systems, multi-processor computer systems, or a mix thereof.

Input/output circuitry 304 provides the capability to input data to, or output data from, computer system 300. For example, input/output circuitry may include input devices, such as keyboards, mice, touchpads, trackballs, scanners, analog to digital converters, etc., output devices, such as video adapters, monitors, printers, etc., and input/output devices, such as, modems, etc. Network adapter 306 interfaces device 300 with a network 310. Network 310 may be any public or proprietary LAN or WAN, including, but not limited to the Internet.

Memory 308 stores program instructions that are executed by, and data that are used and processed by, CPU 302 to perform the functions of computer system 300. Memory 308 may include, for example, electronic memory devices, such as random-access memory (RAM), read-only memory (ROM), programmable read-only memory (PROM), electrically erasable programmable read-only memory (EEPROM), flash memory, etc., and electro-mechanical memory, such as magnetic disk drives, tape drives, optical disk drives, etc., which may use an integrated drive electronics (IDE) interface, or a variation or enhancement thereof, such as enhanced IDE (EIDE) or ultra-direct memory access (UDMA), or a small computer system interface (SCSI) based interface, or a variation or enhancement thereof, such as fast-SCSI, wide-SCSI, fast and wide-SCSI, etc., or Serial Advanced Technology Attachment (SATA), or a variation or enhancement thereof, or a fiber channel-arbitrated loop (FC-AL) interface.

The contents of memory 308 may vary depending upon the function that computer system 300 is programmed to perform. In the example shown in FIG. 3, exemplary memory contents are shown representing routines and data for embodiments of the processes described above. However, one of skill in the art would recognize that these routines, along with the memory contents related to those routines, may not be included on one system or device, but rather may be distributed among a plurality of systems or devices, based on well-known engineering considerations. The present systems and methods may include any and all such arrangements.

In the example shown in FIG. 3, memory 308 may include exemplary memory contents for client memory 312 and server memory 314. Although both client and server memory contents are shown in this example, typically, a single device has only one or the other memory contents. Client memory 312 may include enrollment routines 312, sign-in routines 314, and encryption routines 320, stored template data 322 and operating system 326. Enrollment routines 312 may include software routines to perform enrollment of one or more clients, such as enrollment templates and random templates, as described above. Sign-in routines 314 may include software routines to perform sign-in of a user using, for example, biometric data, as described above. Encryption routines 320 may include software routines to perform encryption of transmitted data, as described above. Server memory 314 may include authentication routines 312, stored template data 324 and operating system 326. Authentication routines 322 may include software routines to perform distance computation, comparison, and/or verification, as described above. Stored template data 324 may include authentication templates of clients, such as enrollments template and random templates, to be used for distance computation, comparison, and/or verification during the authentication process, as described above. Operating system 326 may provide overall system functionality.

As shown in FIG. 3, the present communications systems and methods may include implementation on a system or systems that provide multi-processor, multi-tasking, multi-process, and/or multi-thread computing, as well as implementation on systems that provide only single processor, single thread computing. Multi-processor computing involves performing computing using more than one processor. Multi-tasking computing involves performing computing using more than one operating system task. A task is an operating system concept that refers to the combination of a program being executed and bookkeeping information used by the operating system. Whenever a program is executed, the operating system creates a new task for it. The task is like an envelope for the program in that it identifies the program with a task number and attaches other bookkeeping information to it. Many operating systems, including Linux, UNIX®, OS/2®, and Windows®, are capable of running many tasks at the same time and are called multi-tasking operating systems. Multi-tasking is the ability of an operating system to execute more than one executable at the same time. Each executable is running in its own address space, meaning that the executables have no way to share any of their memory. This has advantages, because it is impossible for any program to damage the execution of any of the other programs running on the system. However, the programs have no way to exchange any information except through the operating system (or by reading files stored on the file system). Multi-process computing is similar to multi-tasking computing, as the terms task and process are often used interchangeably, although some operating systems make a distinction between the two.

The present invention may be a system, a method, and/or a computer program product at any possible technical detail level of integration. The computer program product may include a computer readable storage medium (or media) having computer readable program instructions thereon for causing a processor to carry out aspects of the present invention. The computer readable storage medium can be a tangible device that can retain and store instructions for use by an instruction execution device.

The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of user enrollment and authentication processing, implemented in a computer system comprising a processor, memory accessible by the processor, and computer program instructions stored in the memory, which, when executed by the processor, performs the method comprising:
   receiving and storing enrollment information from a client computer system, the enrollment information comprising an encrypted enrollment template of authentication data; a plurality of randomly generated encrypted templates; and a set of the distances between the encrypted enrollment template and each of the plurality of randomly generated encrypted templates;
   receiving an additional encrypted template to be used to authenticate the user from the client computer system;
   authenticating the user by determining distances between the received additional encrypted template and the stored encrypted enrollment template and the each of the plurality of randomly generated encrypted templates; and
   determining that authentication is successful when the absolute value of the difference between a distance between the additional encrypted template and a selected one of the plurality of randomly generated encrypted template and the distance between the encrypted enrollment template and the selected randomly generated encrypted template is less than or equal to a distance between the additional encrypted template and the encrypted enrollment template.

2. The method of claim 1, wherein each of the plurality of randomly generated encrypted templates is greater than a defined distance from the enrollment template and authenticating the user further comprises determining that the distance between the encrypted enrollment template and the additional encrypted template is less than a threshold value, and determining that the distance between the encrypted enrollment template and each of the plurality of randomly generated encrypted templates is greater than the threshold value.

3. The method of claim 2, wherein each of the plurality of randomly generated encrypted templates is ordered such that a triangle inequality holds among the distance between the encrypted enrollment template and a first randomly generated encrypted template of the plurality of randomly generated encrypted templates, the distance between the encrypted enrollment template and the next randomly generated encrypted template of the plurality of randomly generated encrypted templates, and twice the threshold value.

4. The method of claim 1, wherein at least any three of the plurality of randomly generated encrypted templates meet a geometric invariant and the authenticating further comprises verifying that the invariant is also met for the additional encrypted template and at least any two of the plurality of randomly generated encrypted templates.

5. The method of claim 1, wherein the encryption is Homomorphic Encryption or Functional Encryption and the operations are performed on the encrypted templates using the properties of Homomorphic Encryption or Functional Encryption.

6. The method of claim 1, wherein the authentication data is a biometric template generated from acquired biometric data.

7. A system for user enrollment and authentication processing, the system comprising a processor, memory accessible by the processor, and computer program instructions stored in the memory, which, when executed by the processor, performs:
   receiving and storing enrollment information from a client computer system, the enrollment information comprising an encrypted enrollment template of authentication data; a plurality of randomly generated encrypted templates; and a set of the distances between the encrypted enrollment template and each of the plurality of randomly generated encrypted templates;
   receiving an additional encrypted template to be used to authenticate the user from the client computer system;
   authenticating the user by determining distances between the received additional encrypted template and the stored encrypted enrollment template and the each of the plurality of randomly generated encrypted templates; and
   determining that authentication is successful when the absolute value of the difference between the distance between the additional encrypted template and a selected one of the plurality of randomly generated encrypted template and the distance between the encrypted enrollment template and the selected randomly generated encrypted template is less than or equal to the distance between the additional encrypted template and the encrypted enrollment template.

8. The system of claim 7, wherein each of the plurality of randomly generated encrypted templates is greater than a defined distance from the enrollment template and authenticating the user further comprises determining that the distance between the encrypted enrollment template and the additional encrypted template is less than a threshold value, and determining that the distance between the encrypted enrollment template and each of the plurality of randomly generated encrypted templates is greater than the threshold value.

9. The system of claim 8, wherein each of the plurality of randomly generated encrypted templates is ordered such that a triangle inequality holds among the distance between the encrypted enrollment template and a first randomly generated encrypted template of the plurality of randomly generated encrypted templates, the distance between the encrypted enrollment template and the next randomly generated encrypted template of the plurality of randomly generated encrypted templates, and twice the threshold value.

10. The system of claim 7, wherein at least any three of the plurality of randomly generated encrypted templates meet a geometric invariant and the authenticating further comprises verifying that the invariant is also met for the additional encrypted template and at least any two of the plurality of randomly generated encrypted templates.

11. The system of claim 7, wherein the encryption is Homomorphic Encryption or Functional Encryption and the operations are performed on the encrypted templates using the properties of Homomorphic Encryption or Functional Encryption.

12. The system of claim 7, wherein the authentication data is a biometric template generated from acquired biometric data.

13. A computer program product for user enrollment and authentication processing, the computer program product comprising a non-transitory computer readable storage having program instructions embodied therewith, the program instructions, when executed by a computer, to cause the computer to perform a method comprising:
- receiving and storing enrollment information from a client computer system, the enrollment information comprising an encrypted enrollment template of authentication data; a plurality of randomly generated encrypted templates; and a set of the distances between the encrypted enrollment template and each of the plurality of randomly generated encrypted templates;
- receiving an additional encrypted template to be used to authenticate the user from the client computer system;
- authenticating the user by determining distances between the received additional encrypted template and the stored encrypted enrollment template and the each of the plurality of randomly generated encrypted templates; and
- determining that authentication is successful when the absolute value of the difference between the distance between the additional encrypted template and a selected one of the plurality of randomly generated encrypted template and the distance between the encrypted enrollment template and the selected randomly generated encrypted template is less than or equal to the distance between the additional encrypted template and the encrypted enrollment template.

14. The computer program product of claim 13, wherein each of the plurality of randomly generated encrypted templates is greater than a defined distance from the enrollment template and authenticating the user further comprises determining that the distance between the encrypted enrollment template and the additional encrypted template is less than a threshold value, and determining that the distance between the encrypted enrollment template and each of the plurality of randomly generated encrypted templates is greater than the threshold value.

15. The computer program product of claim 14, wherein each of the plurality of randomly generated encrypted templates is ordered such that a triangle inequality holds among the distance between the encrypted enrollment template and a first randomly generated encrypted template of the plurality of randomly generated encrypted templates, the distance between the encrypted enrollment template and the next randomly generated encrypted template of the plurality of randomly generated encrypted templates, and twice the threshold value.

16. The computer program product of claim 13, wherein at least any three of the plurality of randomly generated encrypted templates meet a geometric invariant and the authenticating further comprises verifying that the invariant is also met for the additional encrypted template and at least any two of the plurality of randomly generated encrypted templates.

17. The computer program product of claim 13, wherein the encryption is Homomorphic Encryption or Functional Encryption and the operations are performed on the encrypted templates using the properties of Homomorphic Encryption or Functional Encryption and the authentication data is a biometric template generated from acquired biometric data.

\* \* \* \* \*